United States Patent [11] 3,612,314

[72] Inventor Eugene L. Cooper
 Route 4, Box 308-C, Sherwood, Oreg. 97140
[21] Appl. No. 32,056
[22] Filed Apr. 27, 1970
[45] Patented Oct. 12, 1971

[54] BOAT LOADER AND UNLOADER FOR VEHICLES
 8 Claims, 5 Drawing Figs.
[52] U.S. Cl. ..................................................... 214/450
[51] Int. Cl. ..................................................... B60r 9/00
[50] Field of Search ........................................... 214/450, 84, 517

[56] References Cited
 UNITED STATES PATENTS
3,045,849 7/1962 Tweten ......................... 214/450
3,435,970 4/1969 Sutton ........................... 214/450

Primary Examiner—Gerald M. Forlenza
Assistant Examiner—John Mannix
Attorney—Oliver D. Olson ABSTRACT: A pair of longitudinally spaced boat-supporting rollers are mounted transversely on top of a vehicle and a driven one of the rollers anchors a pair of laterally spaced boat-handling lines which extend rearward over the rollers for attachment of their rearward ends to opposite sides of a boat forward of the longitudinal center of gravity thereof, with the boat extending longitudinally rearward of the vehicle. A pair of laterally spaced boats support lines extend downward behind the vehicle from adjacent the rear roller for attachment of their lower ends to laterally spaced external points on the rearward end of the boat.

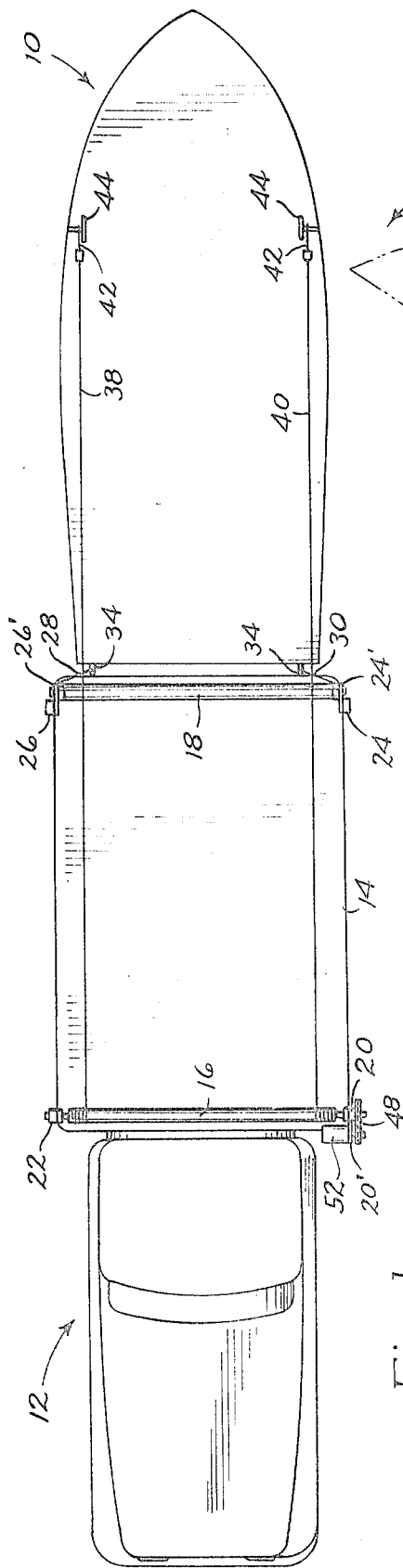
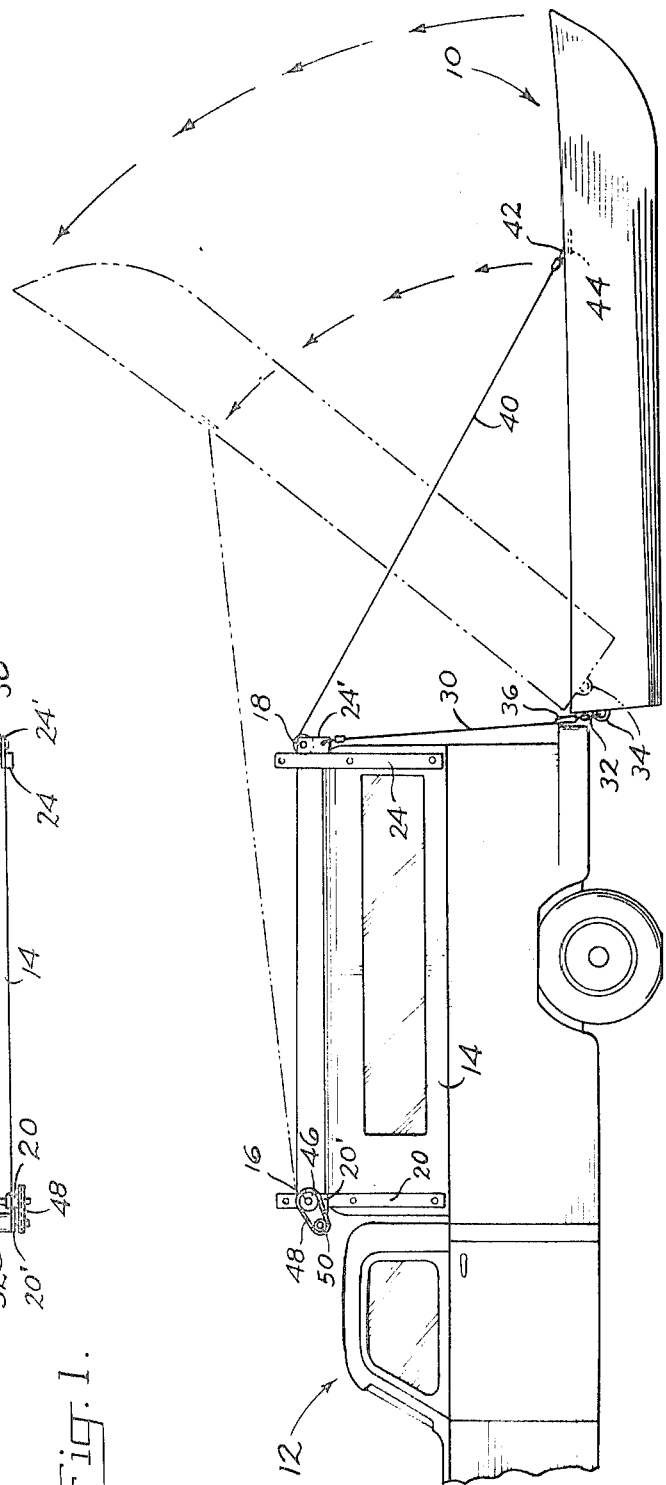
Eugene L. Cooper
INVENTOR

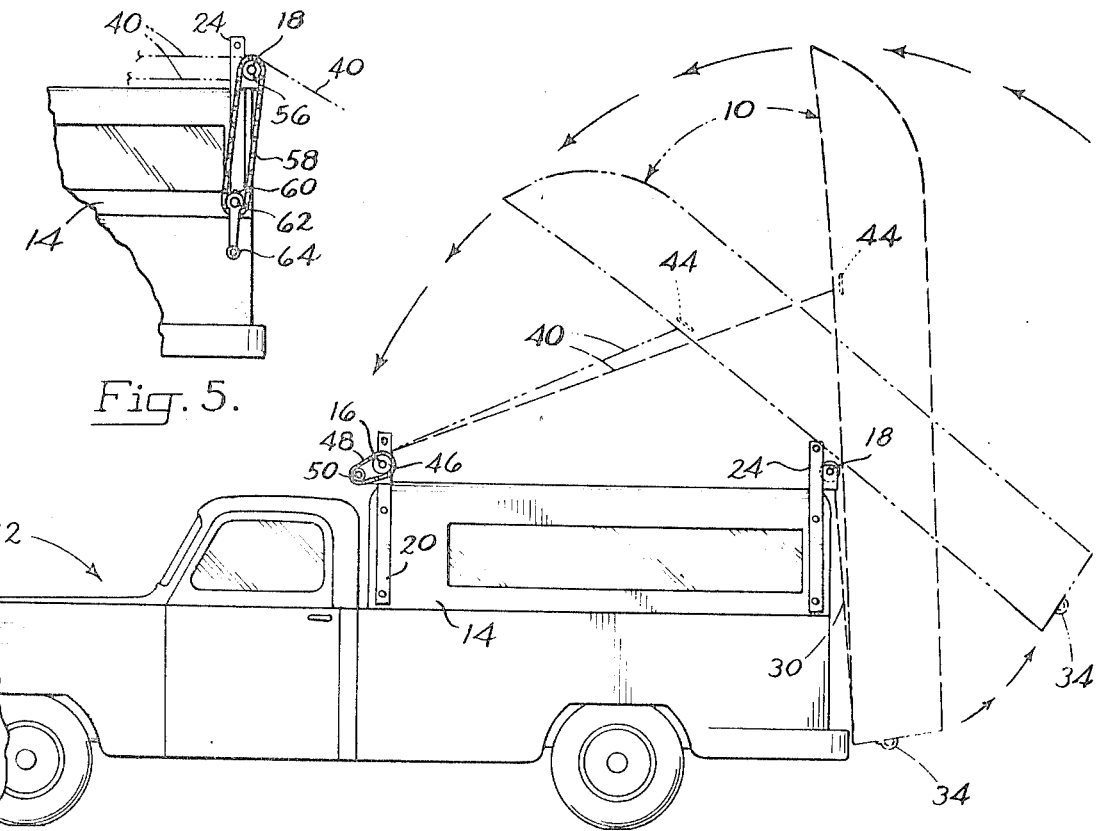
Fig. 5.
Fig. 3.
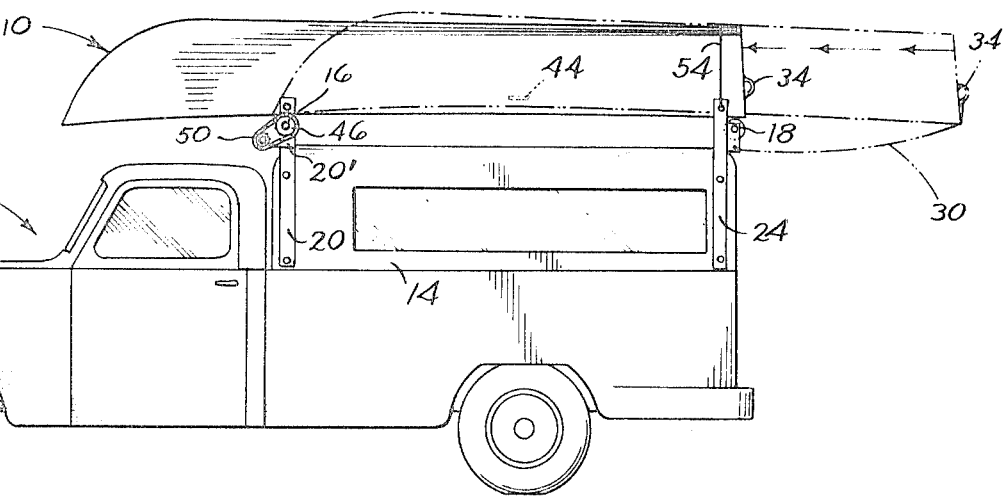
Fig. 4.
Eugene L. Cooper
INVENTOR
BY
Oliver Q. Olson
Agent

BOAT LOADER AND UNLOADER FOR VEHICLES

BACKGROUND OF THE INVENTION

This invention relates to boat-loading apparatus, and more particularly to apparatus for loading a boat onto the top of a vehicle and for unloading the boat therefrom.

Boat loading and unloading apparatus provided heretofore are characterized by complex and costly constructions which require at least partial disassembly and storage of major components when the apparatus is not in use. Some of these also require manual manipulation of several of the components at various stages throughout the loading and unloading operations.

SUMMARY OF THE INVENTION

In its basic concept the boat loader and unloader of the present invention supports the rear of a boat by spaced flexible support lines while boat-handling line means secured at its rearward end to the boat forward of the longitudinal center of gravity thereof and at its forward end to a winch atop a vehicle is hauled in or paid out to load or unload the boat onto or from boat supports atop the vehicle, one of which boat supports is formed by the winch.

It is by virtue of the foregoing basic concept that the principal objective of this invention is achieved; namely, to overcome the aforementioned disadvantages as prior loaders and unloaders.

The foregoing and other objects and advantages of this invention will appear from the following detailed description, taken in connection with the accompanying drawing of the preferred embodiments.

BRIEF DESCRIPTION OF THE DRAWING

FIG. 1 is a plan view of boat loading and unloading apparatus embodying the features of this invention, the same being shown in association with a vehicle and a boat in the unloaded position of the latter.

FIG. 2 is a fragmentary view in side elevation as viewed from the bottom in FIG. 1, the boat being shown in broken lines in an intermediate stage of loading.

FIGS. 3 and 4 are fragmentary side elevations similar to FIG. 2 showing in broken lines further sequential stages of the boat-loading operation.

FIG. 5 is a fragmentary side elevation showing a modified form of winch means for the apparatus of this invention.

DESCRIPTION OF THE PREFERRED EMBODIMENTS

The drawing illustrates the apparatus of this invention in association with a boat 10 and a vehicle 12 for supporting the boat for transport. Although the apparatus is adaptable for use with a variety of types of vehicles, it is shown in the drawing, for the purpose merely of illustration, in association with a pickup truck provided with a camper body 14.

The apparatus includes means for supporting a boat atop the vehicle. In the embodiment illustrated the boat support means includes front and rear elongated rollers 16 and 18 which extend transversely across the vehicle above the top of the camper body. The opposite ends of the front roller 16 are journaled in bearings supported by a pair of laterally spaced mounting brackets 20, 22 which are secured to the opposite sides of the camper body and project above the latter. In similar manner, the rear roller 18 is supported by a pair of laterally spaced mounting brackets 24, 26 which are secured to the camper body adjacent the rear end thereof. The rear roller preferably is mounted on rearward extensions 24' and 26' of the brackets so as to be located rearward of the rear end of the camper body, as illustrated. In this manner the boat makes contact with the rear roller, rather than with the camper body, during loading and unloading, as explained more fully hereinafter. The front roller is spaced forward of the rear roller a distance predetermined to engage the forward portion of the boat during loading of the latter, also as explained more fully hereinafter.

The apparatus of this invention functions to load a boat by positioning the latter longitudinally rearward of the vehicle, with the stern of the boat adjacent the vehicle. From this position the apparatus functions to swing the bow of the boat arcuately upward and forward onto the boat-supporting rollers, in upside down position.

Accordingly, means is provided for supporting the stern end of the boat in laterally stable condition adjacent the vehicle, preferably slightly above the ground. In the embodiment illustrated such means is provided by a pair of laterally spaced, elongated, flexible lines 28, 30. These lines may be of rope, cable or chain. The upper ends of the lines are secured, preferably removably, one to each of the brackets 24, 26 which support the rear roller 18. The lines hang downward behind the vehicle and are provided at their lower ends with hooks 32, or other suitable form of connector, for releasable attachment to a pair of laterally spaced eyelets 34 secured to the outer side of the stern of the boat. The lower portions of the lines, i.e. the portions which are engageable by the boat, preferably are covered with rubber 36, or other suitable buffer material, to prevent abrasion and other damage to the boat.

Boat-handling means is provided for swinging the boat arcuately upward and forward in the boat-loading operation and arcuately downward and rearward in the boat-unloading operation. In the embodiment illustrated this means is provided by a pair of laterally spaced, elongated, flexible boat-handling lines 38, 40. The rearward ends of these lines are provided with loops 42, hooks, or other suitable form of connector, for releasable attachment to boat cleats 44, eyelets, or other desired anchor means, secured to the opposite sides of the boat forward of the longitudinal center of gravity of the latter.

In the embodiment illustrated in FIGS. 1–4, the boat-handling lines extend forward over the rear roller 18 and thence over the front roller 16. The forward end of these lines are secured to the front roller at laterally spaced positions, whereby the front roller functions as a winch drum for hauling in and paying out the boat handling lines.

To this end means is provided for rotating the front roller. Thus, one end of the roller extends laterally through its mounting bracket 20 and mounts a sprocket 46 for rotation therewith. The sprocket is coupled through a drive chain 48 to a sprocket 50 secured to the output shaft of a combination electric motor and gear reduction unit 52. The latter is mounted on a forward projection 20' of the mounting bracket 20.

It is desirable that the operator be able to move about adjacent the rear end of the vehicle during the loading and unloading operations, for the purpose of inspection or other desired functions. Accordingly, control of operation of the electric motor preferably is provided by an elongated, flexible electrical conductor cable (not shown) provided at one end with a control switch for manipulation by the operator and connected at the opposite end to the electric motor and battery supply source of the vehicle, in manner which will be apparent.

The operation of the apparatus described hereinbefore is as follows: Assuming it is desired to load the boat 10 onto the vehicle 12, the boat is positioned rearward of the vehicle as illustrated in FIGS. 1 and 2. By lifting each side of the stern slightly above the ground the operator is able to attach the lower ends of the support lines 28, 30 to the eyelets 34. The stern of the boat thus is supported slightly above the ground and in a laterally stabilized condition.

The boat-handling lines 38, 40 then are paid out rearwardly and their rearward ends attached to the boat cleats 44 at opposite sides of the boat. The operator then energizes the electric motor drive unit 52 in the direction to haul in the handling lines onto the winch drum formed by the front roller 16.

As the bow of the boat swings arcuately upward (FIG. 1), the lower portions of the support lines 28, 30 function to space the stern of the boat from the vehicle until the boat extends vertically upward and its gunwale bears against the rear roller 18 (FIG. 3).

As the handling lines continue to be hauled in, the boat pivots arcuately forward about the rear roller (FIG. 3). The support lines maintain their full extension in continuing to support the boat against rearward movement.

Further hauling in of the handling lines causes the boat to be pulled forward over the rear roller 18, allowing the support lines 28, 30 to slacken (FIG. 4). When the longitudinal center of gravity of the boat moves forward over the rear roller, the bow of the boat swings downward by gravity onto the front roller 16.

Accordingly, the spacing between the front and rear rollers preferably is predetermined to be slightly less than the distance from the bow of the boat to the longitudinal center of gravity thereof. If it is desired that the spacing between the rollers be greater than this distance, the operator at the rear of the vehicle may pull downward on the stern of the boat to shift the longitudinal center of gravity of the boat sufficiently rearward to accommodate the greater distance between the rollers.

Continued hauling in of the handling lines causes the boat to be pulled forward until the rearward end of the lines and the connecting boat cleats 44 are positioned vertically above the front roller (FIG. 4). Since the gear reduction unit associated with the electric motor prevents rotation of the roller when the motor is deenergized, the forward portion of the boat is secured firmly in position of the front roller.

Various means may be employed to secure the stern of the boat on the rear roller. In the embodiment illustrated, a rope 54 or other suitable form of flexible line is laid over the inverted boat and secured at its opposite ends to the rear roller or its mounting brackets. The slackened support lines 28, 30 preferably are removed and stored in the vehicle.

Alternatively, the slackened support lines 28, 30 hanging downward at the rear of the vehicle may be connected intermediate their ends by ropes, elastic cords, or other suitable lines, to the rear bumper of the vehicle. For this purpose the opposite ends of the connecting lines may be provided with hooks, one to engage the support lines and the other to engage the bumper.

As a further alternative, the support lines 28, 30 may be disconnected from the eyelets 34 at the stern of the boat and extended across the inverted boat in opposite directions, i.e. toward the side opposite their attachment to the brackets, and their free ends connected through lengths of rope, elastic cord, etc., to said brackets.

When it is desired to unload the boat from the vehicle, the operator removes the holddown means which secures the stern of the boat, couples the support lines 28, 30 to the eyelets 34 at the stern of the boat, and then activates the electric motor drive unit 52 to rotate the front roller 16 clockwise (FIG. 4) to effect paying-out of the handling lines 38, 40. This clockwise rotation of the front roller also serves to move the boat rearward as the handling lines pay out, since the forward portion of the boat rests upon the front roller. When the longitudinal center of gravity of the boat passes rearward over the rear roller 18 the boat swings clockwise automatically through the sequences illustrated in FIGS. 4, 3 and 2 to the unloaded position illustrated in FIG. 2. The support and handling lines then are uncoupled from the boat, whereupon the latter is ready for use.

It will be apparent that the foregoing unloading operation may be performed with the vehicle stationed at water edge, to afford launching of the boat directly in the water.

The embodiment illustrated in FIG. 5 differs from the embodiment previously described primarily in the replacement of the electric drive unit 52 with a manually operated crank drive system. As previously explained, it is desirable that the operator be able to take a position adjacent the rear of the vehicle. Accordingly, the manually operated crank system preferably is located adjacent the rear of the vehicle. In the embodiment illustrated, one end of the rear roller 18 extends through the mounting bracket 24 and mounts a sprocket 56 which is connected through the drive chain 58 to a sprocket 60 mounted on a crankshaft 62 journaled in a bearing on the bracket 24. The crankshaft mounts a handcrank 64.

The handling lines 38, 40 extend forward from their rear end connections to the boat cleats 44, over the rear roller 18, thence about the front roller 16 and rearward for connection to the rear roller 18. The rear roller thus functions as the winch drum for the handling lines and also serves as a drive roller for moving the boat rearward during the unloading operation, in manner similar to the corresponding functions of the front roller in the embodiment previously described.

It will be understood that although both transversely elongated boat support means have been illustrated and described herein as rollers 16 and 18, the undriven roller may be replaced by a fixed bar or other nonrotatable member. Said nonrotatable member functions to support the boat and allows the latter to slide thereon during the loading and unloading operations. The use of rollers for both supports is preferred, however, for minimizing friction.

The pair of laterally spaced handling lines 38, 40 may be replaced by a single handling line. In such event the rearward end of the handling line may be connected to a boat cleat or other coupling member at the bow of the boat, or at any other convenient point forward of the longitudinal center of gravity of the boat and on the longitudinal centerline of the boat. Lateral stability of the boat during the loading and unloading operations is provided by the pair of laterally spaced support lines 28, 30.

If it is desired to provide one or more rollers or other form of boat supports intermediate the rollers 16 and 18, a pair of longitudinal bars may be extended one between brackets 20 and 22 and the other between brackets 24 and 26 to mount the intermediate boat support. The bars may be precut to length, or each may be made up of a pair of bars interconnected for longitudinal adjustment to correspond to the spacing between the associated brackets.

The apparatus of the invention is adaptable for use with a variety of types of vehicles, primarily by suitable modification of the laterally spaced mounting brackets 20, 22, 24 and 26. For example, if the apparatus is to be used with a pickup truck which does not include the camper body, the brackets are provided in the form of upstanding posts secured to the pickup body. If the apparatus is to be used with a passenger vehicle, the brackets may be provided in a form capable of attachment to the rain gutters or other portions of the vehicle body, as will be understood.

The foregoing and various other modifications and changes in the size, shape, number and arrangement of the parts may be made without departing from the spirit of this invention.

Having now described my invention and the manner in which it may be used, I claim:

1. A boat loader and unloader for vehicles, comprising
   a. front and rear boat support means,
   b. mounting means adapted for attachment to a vehicle for mounting the boat support means above and transversely of the vehicle for supporting a boat thereon,
   c. at least one of the support means comprising a transversely elongated roller,
   d. rotary drive means on the mounting means engaging the roller for rotating the latter,
   e. elongated, flexible boat-handling line means secured at the forward end thereof to the driven roller and extendable rearwardly over the front and rear boat support means for releasable attachment of the rearward end thereof to a boat forward of the longitudinal center of gravity of the latter, and
   f. a pair of laterally spaced, elongated, flexible boat support lines supported at their upper ends by the mounting means and extending downward adjacent the rear of a vehicle for releasable attachment of their lower ends to laterally spaced external points on the rear end of a boat for supporting the latter.

2. The boat loader and unloader of claim 1 wherein the boat-handling line means comprises a pair of laterally spaced lines secured to the driven roller and attachable at their rearward ends to opposite sides of a boat.

3 The boat loader and unloader of claim 1 wherein the mounting means comprises a pair of laterally spaced rear mounting brackets for mounting the rear boat support means and the pair of boat support lines adjacent the rear of a vehicle, and a pair of laterally spaced front mounting brackets for mounting the front boat support means forwardly of the rear support means.

4. The boat loader and unloader of claim 1 including buffer means on the lower portions of the boat support lines for protective engagement of the boat.

5. The boat loader and unloader of claim 1 wherein the driven roller comprises the front boat support means.

6 The boat loader and unloader of claim 5 wherein the rotary drive means comprises an electric motor drive unit operatively connected to the roller.

7 . The boat loader and unloader of claim 1 wherein the drive roller comprises the rear boat support means.

8. The boat loader and unloader of claim 7 wherein the rotary drive means comprises a handcrank operatively connected to the roller.